(12) United States Patent
Takeuchi et al.

(10) Patent No.: US 12,561,414 B2
(45) Date of Patent: Feb. 24, 2026

(54) VEHICLE SECURITY DEVICE, SECURITY METHOD, AND RECORDING MEDIUM

(71) Applicant: Panasonic Automotive Systems Co., Ltd., Kanagawa (JP)

(72) Inventors: Akihito Takeuchi, Osaka (JP); Kaoru Yokota, Hyogo (JP); Tomoyuki Haga, Nara (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 54 days.

(21) Appl. No.: 18/884,872

(22) Filed: Sep. 13, 2024

(65) Prior Publication Data

US 2025/0139212 A1 May 1, 2025

(30) Foreign Application Priority Data

Oct. 26, 2023 (JP) ................................. 2023-184213

(51) Int. Cl.
| | |
|---|---|
| *G06F 21/30* | (2013.01) |
| *B60R 25/40* | (2013.01) |
| *G06F 21/31* | (2013.01) |

(52) U.S. Cl.
CPC ............ *G06F 21/31* (2013.01); *B60R 25/403* (2013.01)

(58) Field of Classification Search
CPC ............................... G06F 21/31; B60R 25/403
See application file for complete search history.

(56) References Cited

U.S. PATENT DOCUMENTS

| | | |
|---|---|---|
| 2015/0195297 A1 | 7/2015 | Ben Noon et al. |
| 2020/0160633 A1* | 5/2020 | Zhang ................... B60R 25/102 |
| 2020/0211301 A1* | 7/2020 | Zhang ................... H04L 63/065 |
| 2020/0213287 A1* | 7/2020 | Zhang ................... H04L 63/123 |
| 2020/0223395 A1* | 7/2020 | Zhang ..................... B60R 25/01 |

FOREIGN PATENT DOCUMENTS

JP        6382724        8/2018

* cited by examiner

*Primary Examiner* — Normin Abedin
(74) *Attorney, Agent, or Firm* — Greenblum & Bernstein, P.L.C.

(57) ABSTRACT

A vehicle security device installed in a vehicle is provided. The vehicle includes: a first ECU including the vehicle security device; and a second ECU connected to the first ECU, which controls a device provided in the vehicle. The vehicle security device includes: a dynamic authorizer that performs, when an access request for access to an access destination in the vehicle is issued from an access source in the vehicle, an authorization determination; and a connection manager that outputs, when the access request is authorized, a log corresponding to the access request to a resource of the access destination. The connection manager includes: an obtainer that obtains the access request from the second ECU; a calculator that calculates a degree of risk in the second ECU based on the log; and a controller that controls an access volume to the dynamic authorizer according to the degree of risk.

15 Claims, 6 Drawing Sheets

FIG. 2

(a)
Zone ECU 1

| Risk value | Transmission cycle |
|------------|--------------------|
| 0-30 | 200 ms |
| 31-70 | 100 ms |
| 71-100 | 50 ms |

(b)
Zone ECU 2

| Risk value | Transmission cycle |
|------------|--------------------|
| 0-30 | 500 ms |
| 31-70 | 250 ms |
| 71-100 | 125 ms |

(c)
Zone ECU 3

| Risk value | Transmission cycle |
|------------|--------------------|
| 0-30 | 1000 ms |
| 31-70 | 500 ms |
| 71-100 | 250 ms |

| ECU | Base transmission cycle |
|---|---|
| Zone ECU 1 | 100 ms |
| Zone ECU 2 | 250 ms |
| Zone ECU 3 | 500 ms |

(b)

| Risk value | Risk coefficient |
|---|---|
| 0-30 | × 2 |
| 31-70 | × 1 |
| 71-100 | × 0.5 |

| Risk value | Determination frequency |
|------------|-------------------------|
| 0-30 | Every five times |
| 31-70 | Every three times |
| 71-100 | Every time |

Start

Receive access request for log transmission    —S11

Receive log after authorization by PDP    —S12

Calculate risk value based on log    —S13

Determine log transmission cycle based on risk value    —S14

Transmit information indicating log transmission cycle    —S15

End

FIG. 7

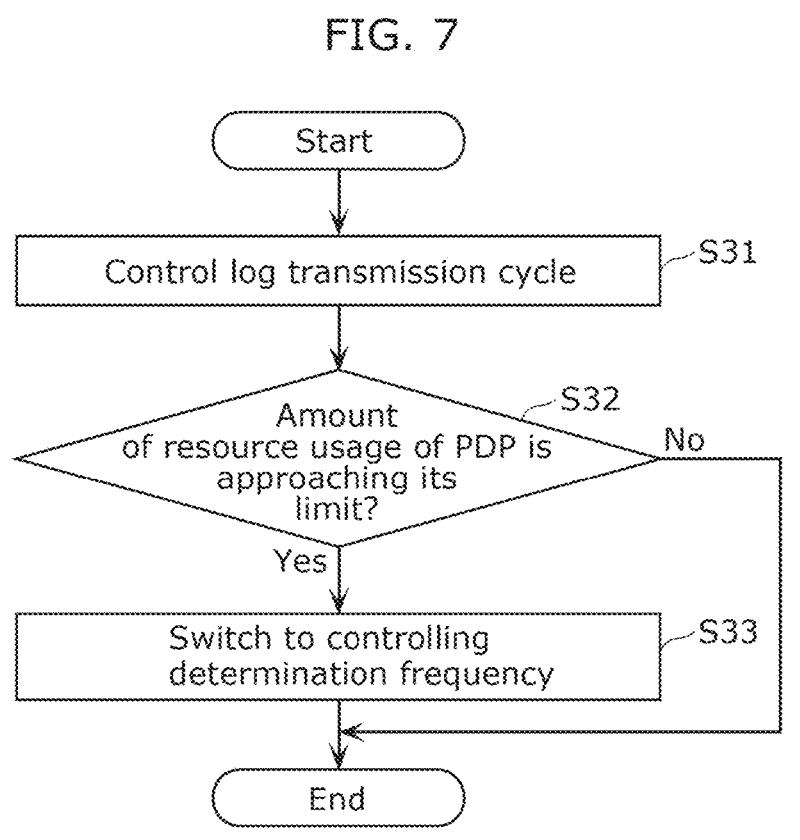

```
        ┌──────────────┐
        │    Start     │
        └──────┬───────┘
               │
               ▼
  ┌─────────────────────────────┐
  │ Control log transmission    │──── S31
  │          cycle              │
  └──────────────┬──────────────┘
               │
               ▼
         Amount                        ── S32
  of resource usage of PDP is    ─────────── No ──┐
      approaching its                            │
          limit?                                 │
               │                                 │
              Yes                                │
               ▼                                 │
  ┌─────────────────────────────┐               │
  │     Switch to controlling   │──── S33        │
  │   determination frequency   │               │
  └──────────────┬──────────────┘               │
               │◄───────────────────────────────┘
               ▼
        ┌──────────────┐
        │     End      │
        └──────────────┘
```

1

VEHICLE SECURITY DEVICE, SECURITY METHOD, AND RECORDING MEDIUM

CROSS REFERENCE TO RELATED APPLICATION

The present application is based on and claims priority of Japanese Patent Application No. 2023-184213 filed on Oct. 26, 2023.

FIELD

The present disclosure relates to a vehicle security device installed in a vehicle, a security method, and a recording medium.

BACKGROUND

In recent years, many devices called electronic control units (hereinafter, referred to as ECUs) are disposed in a system inside an automobile (an example of a vehicle). A network connecting these ECUs is called an in-vehicle network. An example of a vehicle with such an in-vehicle network is a vehicle what is called a connected car having a function to connect to an external network such as the Internet. With regard to connected cars, the threat of an attacker breaking into the in-vehicle network from a network outside the vehicle and taking unauthorized control of the vehicle has been pointed out, and thus security considerations are underway.

For example, Patent Literature (PTL) 1 discloses a technology for identifying, by monitoring communication traffic data on an in-vehicle communication network (in-vehicle network), abnormality in the communication traffic data that affects an operation of a vehicle.

CITATION LIST

Patent Literature

PTL 1: Japanese Patent No. 6382724

SUMMARY

In recent years, security risk in vehicles has been increasing due to the spread of electric vehicles, and thus the introduction of what is called a zero trust architecture (ZTA) has been considered.

Under the application of the ZTA to a vehicle, when each of ECUs and applications accesses a resource, an authorization determination for the access request is performed at a policy decision point (PDP) in the ZTA. Since an authorization determination is performed at the PDP for each of access requests from ECUs, applications, etc., the concentration of processing for the authorization determinations occurs at the PDP, leading to concerns about driving real-time performance and processing load.

In view of this, the present disclosure provides a vehicle security device, a security method, and a recording medium capable of reducing the concentration of processing on the PDP.

An aspect of the present disclosure provides a vehicle security device installed in a vehicle. The vehicle includes: a first electronic control unit (ECU) in which the vehicle security device is provided; and a second ECU that is connected to the first ECU and controls a device provided in the vehicle. The vehicle security device includes: a dynamic authorizer that performs, when an access request for access to an access destination in the vehicle is issued from an access source in the vehicle, an authorization determination for the access request; and a connection manager that outputs, when the access request is authorized, a log corresponding to the access request to a resource of the access destination. The connection manager includes: an obtainer that obtains the access request transmitted from the second ECU; a calculator that calculates a degree of risk in the second ECU based on the log obtained; and a controller that controls an access volume that is a volume of access to the dynamic authorizer according to the degree of risk calculated.

An aspect of the present disclosure provides a security method to be executed by a vehicle security device installed in a vehicle. The vehicle includes: a first electronic control unit (ECU) in which the vehicle security device is provided; and a second ECU that is connected to the first ECU and controls a device provided in the vehicle. The security method includes: performing, when an access request for access to an access destination in the vehicle is issued from an access source in the vehicle, an authorization determination for the access request by a dynamic authorizer included in the vehicle security device; and outputting, when the access request is authorized, a log corresponding to the access request to a resource of the access destination. The outputting to the resource of the access destination includes: obtaining the access request transmitted from the second ECU; calculating a degree of risk in the second ECU based on the log obtained; and controlling an access volume to the dynamic authorizer according to the degree of risk calculated.

An aspect of the present disclosure provides a non-transitory computer-readable recording medium having recorded thereon a program for causing a computer to execute the security method described above.

An aspect of the present disclosure provides the vehicle security device, for example, capable of reducing the concentration of processing on the PDP.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 2 illustrates tables each showing a relationship between a risk value and a transmission cycle according to the embodiment.

FIG. 3 is a diagram illustrating different types of tables used to calculate a transmission cycle using a base transmission cycle and a risk coefficient according to the embodiment.

FIG. 7 is a flowchart showing a third operation of the integrated ECU according to the embodiment.

DESCRIPTION OF EMBODIMENTS (Circumstances Leading to the Present Disclosure)

As described in the "Summary" section above, the introduction of the ZTA in vehicles has been considered. In addition, since security events occurring in vehicles are more likely to be related to cyberattacks, storing logs and utilizing the stored logs for analysis at a security operation center (SOC) have been considered. For this purpose, the PDP is required to perform authorization determinations for access requests to collect logs in addition to authorization determinations for normal access requests. This increases the volume of access (access volume) to the PDP, thus possibly producing adverse effects on normal vehicle functions. Moreover, if a large number of access requests are issued to collect logs due to cyberattacks, for example, determinations from the PDP regarding permission or denial of resource accesses may experience delays. As a result, the loss of logs due to buffer overflow may occur at a log transmission source. In this way, the occurrence of the concentration of processing on the PDP may cause the adverse effects on the normal vehicle functions and the loss of logs.

Note that zero trust is a security concept of preventing threats to information assets to be protected by verifying the security of every access to the information assets without trusting any of entities seeking to access the information assets.

In view of this, the inventors of the present application have conducted intensive studies about vehicle security devices, etc. capable of reducing the concentration of processing on the PDP and have invented vehicle security devices, etc. as shown below.

Embodiments will be specifically described below with reference to the drawings.

Each of the exemplary embodiments described below shows a general or specific example. The numerical values, shapes, materials, elements, the arrangement and connection of the elements, etc. shown in the following exemplary embodiments are mere examples, and therefore do not limit the scope of the present disclosure.

Terms describing relationships between elements, such as "the same", as well as numerical values and numerical ranges as used herein are not intended to express strict meaning only, but rather intended to encompass substantially equivalent ranges, e.g., differences of about a few percent (or about 10%).

A "connection" between elements means an electrical connection therebetween, and includes not only the case where two elements are directly connected to each other, but also the case where two elements are indirectly connected with another element being interposed between the two elements.

Embodiment

A vehicle security device according to an embodiment will be described below.

(1. Configuration of Vehicle Security System)

Figure 1:
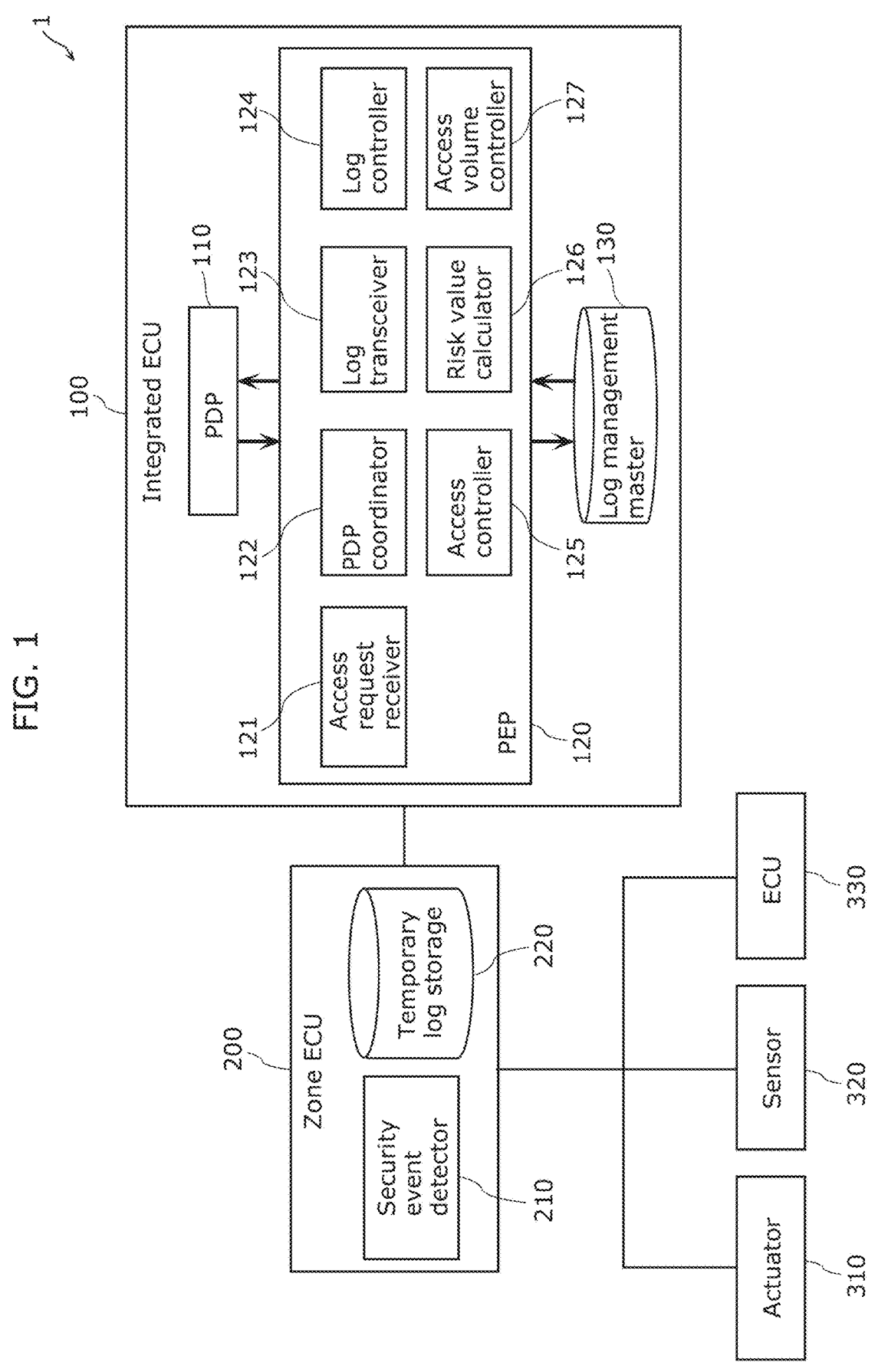
FIG. 1 is a block diagram illustrating an example of a vehicle security system according to an embodiment.

FIG. 1 is a block diagram illustrating an example of vehicle security system 1 according to the present embodiment. Vehicle security system 1 is installed in a vehicle (an example of a mobile object). For example, vehicle security system 1 needs to include at least dynamic authorizer 110 and connection manager 120. Integrated electronic control unit (ECU) 100, zone ECU 200, actuator 310, sensor 320, and ECU 330, which are provided in the vehicle, may not be components of vehicle security system 1.

Vehicle security system 1 is a system for applying a zero trust architecture to vehicles. The zero trust architecture is, for example, National Institute of Standards and Technology (NIST) Special Publication (SP) 800-207 Zero Trust Architecture. When the zero trust architecture is applied to the vehicle, authorization is performed dynamically for each of various resources included in the vehicle (for each of access requests). To dynamically authorize the access requests, vehicle security system 1 includes dynamic authorizer 110 and connection manager 120 provided in integrated ECU 100. Dynamic authorizer 110 is an example of a policy decision point (PDP) in the zero trust architecture, and connection manager 120 is an example of a policy enforcement point (PEP) in the zero trust architecture. Note that in the drawings, dynamic authorizer 110 is described as PDP and connection manager 120 is described as PEP.

The access requests include at least a request to save a log, but may also include a request to use a predetermined service, and an access control request to control a predetermined resource, for example. The request to use the predetermined service and the access control request to control the predetermined resource are requests to implement normal functions of the vehicle.

FIG. 1 illustrates: integrated ECU 100; zone ECU 200 connected to integrated ECU 100; and actuator 310, sensor 320, and ECU 330 connected to zone ECU 200, which are all provided in the vehicle. In other words, the vehicle includes the ECU (integrated ECU 100) and zone ECU 200. Although only one zone ECU is illustrated in FIG. 1 for the sake of convenience, one or more (e.g., a plurality of) zone ECUs 200 are connected to integrated ECU 100.

Integrated ECU 100 is an ECU that controls the entire vehicle while taking a central role among zone ECU 200 and others. Integrated ECU 100 is an example of the vehicle security device installed in the vehicle. Integrated ECU 100 is a central ECU in which a plurality of ECUs are integrated. Integrated ECU 100 is an ECU in which functions, which have been conventionally assigned to a plurality of ECUs separately, are integrated to solve issues of development time and costs, which increase with the complexity of an in-vehicle system. Integrated ECU 100 is also an ECU in which a virtualization technology is used to run a plurality of virtual computers (virtual machines: VMs) on a single ECU.

Integrated ECU 100 includes dynamic authorizer 110 and connection manager 120. Integrated ECU 100 is an example of an ECU (a first ECU) in which dynamic authorizer 110 and connection manager 120 are provided. Integrated ECU 100 also includes log management master 130, which is an example of a resource of integrated ECU 100. Integrated ECU 100 is a computer that includes a processor (microprocessor) and memories. The memories include a read only memory (ROM) and a random access memory (RAM), for example. The memories can store programs to be executed by the processor.

In integrated ECU 100, security software, a hypervisor, and TrustZone (trademark) run on a system-on-chip (hereinafter, referred to as an SoC), which is hardware. A plurality of virtual machines run on the hypervisor. A different operating system (hereinafter, referred to as an OS) runs on each of the virtual machines. Dynamic authorizer 110 operates in TrustZone. The hardware refers to a machine or device capable of receiving data, performing a logical operation on data, storing data, or displaying data. Examples of such hardware may include, but are not limited to, a processor and a memory. The security software is security software that implements TrustZone. The hypervisor is software serving as a virtualization platform to run one or more virtual machines.

Dynamic authorizer 110 may operate in a trusted execution environment (TEE) such as TrustZone or may operate in a normal execution environment (a non-secure environment, also referred to as a rich execution environment (REE)). The TEE functions independently of the normal OS provided in the virtual machine. Dynamic authorizer 110 is implemented, for example, by the processor that executes the programs stored in the memories.

When connection manager 120 receives an access request for access to an access destination in the vehicle from an access source in the vehicle, dynamic authorizer 110 performs an authorization determination for the access request (specifically, a determination as to whether the access request can be permitted). The authorization determination is performed, for example, using a permission list. The permission list describes which access source is permitted to access which access destination when the vehicle is in what condition. The permission list is also referred to as a policy.

When the access request is authorized by dynamic authorizer 110, connection manager 120 performs a process to output a log corresponding to the access request to a resource of the access destination. When the access request is authorized, connection manager 120 establishes a connection between the access source (e.g., zone ECU 200) and the access destination (e.g., log management master 130) to enable communication between the access source and the access destination.

Connection manager 120 includes access request receiver 121, PDP coordinator 122, log transceiver 123, log controller 124, access controller 125, risk value calculator 126, and access volume controller 127.

Access request receiver 121 receives access requests from ECUs and applications. In the example of FIG. 1, access request receiver 121 receives an access request transmitted from zone ECU 200. Access request receiver 121 is configured to include a communication module (communication circuit), for example. Access request receiver 121 is an example of an obtainer that obtains an access request.

When access request receiver 121 receives the access request, PDP coordinator 122 transmits an access determination request for the received access request to dynamic authorizer 110 and receives a determination result of authorization (the access is permitted) or denial (no access is permitted) in dynamic authorizer 110. The access determination request is a request to determine whether the access is authorized or denied for the received access request. The access determination request includes information indicating the access source, for example.

Log transceiver 123 transmits and receives logs. For example, log transceiver 123 receives a log from each ECU. In the example of FIG. 1, log transceiver 123 receives logs stored in temporary log storage 220 from zone ECU 200. Log transceiver 123 is configured to include a communication module (communication circuit), for example. Such a log may be received together with the access request or at a timing different from the access request.

Log controller 124 performs a process to store the log received by log transceiver 123 in log management master 130 and a process to read the log stored in log management master 130. By outputting the log received by log transceiver 123 to log management master 130, for example, log controller 124 stores that log in log management master 130.

When dynamic authorizer 110 determines that the received access request is to be executed, access controller 125 performs control according to the access request.

Risk value calculator 126 calculates a risk value in zone ECU 200 based on the obtained log. The risk value as used herein refers to a magnitude of a security threat to an in-vehicle network included in the vehicle in which integrated ECU 100 is installed. The risk value is, for example, a value indicating a security risk such as being under cyberattack or being infected with malware.

Risk value calculator 126 calculates a risk value based on, for example, a type of abnormality included in a log (e.g., a log regarding a security event) and a frequency of occurrence of that abnormality. When the abnormality is of a type with a high security risk, risk value calculator 126 calculates the risk value to be higher. When the abnormality occurs at a high frequency, risk value calculator 126 calculates the risk value to be lower. Therefore, even when an abnormality is of a type with a high security risk, the risk value of the abnormality may be calculated low if the abnormality is occurring frequently. Risk value calculator 126 may calculate a risk value based on a table in which a type of abnormality and a frequency of occurrence of the abnormality are mapped to a risk value, for example.

In the present embodiment, the risk value is a numerical value of at least 0 and at most 100. When a plurality of zone ECUs are connected to integrated ECU 100, the risk value is calculated for each of the plurality of zone ECUs. The risk value is an example of a degree of risk. Note that degrees of risk are not limited to being numerical values, but may be two or more graded levels (ranks) such as "high", "medium", and "low", for example. Risk value calculator 126 is an example of a calculator that calculates a degree of risk.

Access volume controller 127 controls a volume of access to dynamic authorizer 110 according to the calculated risk value. As described below in detail, access volume controller 127 controls, as an access volume, at least one of a transmission cycle (transmission frequency) of logs transmitted from zone ECU 200 to integrated ECU 100 or a determination frequency of causing dynamic authorizer 110 to perform an authorization determination for an access request. Access volume controller 127 is an example of a controller.

Connection manager 120 also includes a storage (not shown) that stores various information to be used by access volume controller 127 to determine the access volume. The various information will be described with reference to FIGS. 2 to 4.

Figures 4, 5:
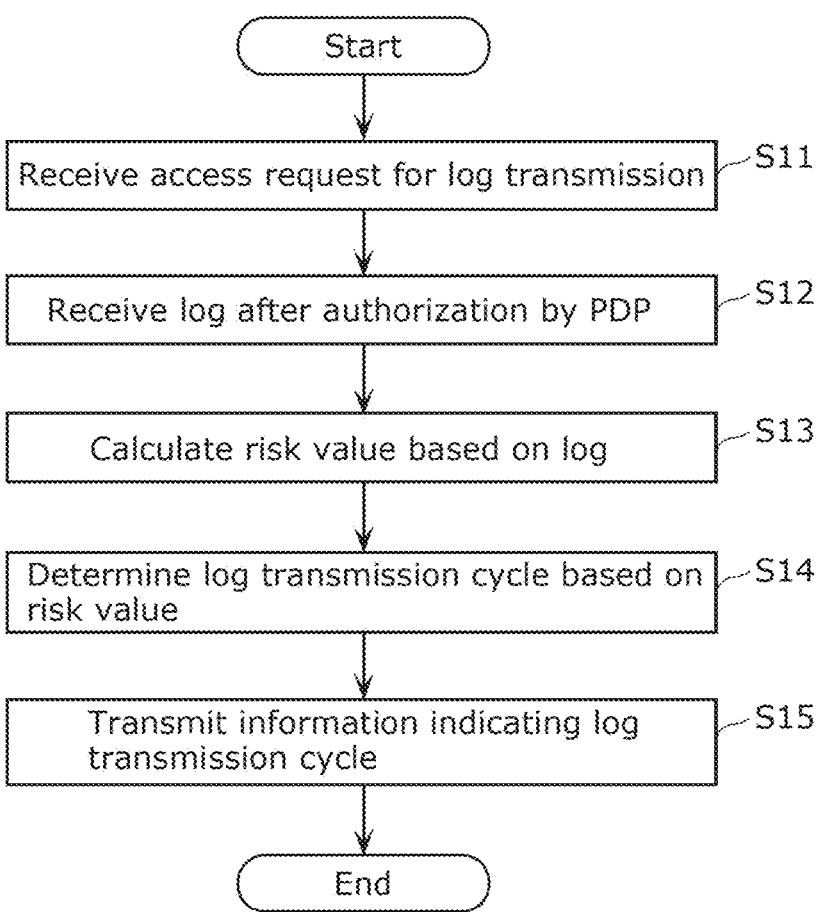
FIG. 4 is a table showing a relationship between a risk value and a determination frequency according to the embodiment.
FIG. 5 is a flowchart showing a first operation of an integrated ECU according to the embodiment.

FIG. 2 illustrates tables each showing a relationship between a risk value and a transmission cycle according to the present embodiment. FIG. 3 is a diagram illustrating different types of tables used to calculate a transmission cycle using a base transmission cycle and a risk coefficient according to the present embodiment. FIG. 4 is a table showing a relationship between a risk value and a determination frequency according to the present embodiment. The tables shown in FIGS. 2 to 4 are set in advance.

(a) in FIG. 2 shows a relationship between a risk value and a transmission cycle for zone ECU 1. (b) in FIG. 2 shows a relationship between a risk value and a transmission cycle for zone ECU 2. (c) in FIG. 2 shows a relationship between a risk value and a transmission cycle for zone ECU 3.

As described above, transmission cycles corresponding to risk values are set in advance for each of zone ECUs 200. Although different tables are used for different zone ECUs 200, at least two of the plurality of zone ECUs 200 may use a common table. For example, the risk values and the transmission cycles are set so that a higher risk value is mapped to a shorter transmission cycle. A shorter transmission cycle means a higher transmission frequency.

(a) in FIG. 3 illustrates a table showing a relationship between zone ECU 200 and a base transmission cycle. The base transmission cycle is a reference transmission cycle set in advance for each of zone ECUs 200. The base transmission cycle may be a transmission cycle to be used in normal times, for example.

(b) in FIG. 3 illustrates a table showing a relationship between a risk value and a risk coefficient to be multiplied by a base transmission cycle. For example, the risk values and the risk coefficients are set so that a higher risk value makes a calculated transmission cycle shorter. Note that (b) in FIG. 3 may also be a table showing a relationship between a risk value and an amount of correction (e.g., an amount of addition or subtraction to or from a transmission cycle).

FIG. 4 is a table showing a relationship between a risk value and a determination frequency to be performed by dynamic authorizer 110 (PDP). For example, the risk values and the determination frequencies are set so that a higher risk value is mapped to a higher determination frequency. Note that every five times means that when five access requests are issued by zone ECU 200, dynamic authorizer 110 is required to perform an authorization determination for only one of the five access requests. The number of authorization determinations to be performed by dynamic authorizer 110 can be reduced as the risk value decreases.

Note that it is sufficient if the storage of connection manager 120 stores the table(s) shown in at least one of FIGS. 2 to 4.

Referring back to FIG. 1, log management master 130 is a storage device that manages (stores) logs from zone ECUs 200. Log management master 130 is an example of a resource included in integrated ECU 100. For example, log management master 130 is implemented by an HDD or a semiconductor memory. Alternatively, log management master 130 may be provided in TrustZone. Log management master 130 is an example of a storage.

Zone ECU 200 is located in the vehicle and controls resources in an area in which zone ECU 200 is located. Zone ECU 200 is connected to a device provided in the vehicle and controls the connected device. In the present embodiment, zone ECU 200 controls actuator 310, sensor 320, and ECU 330. Zone ECU 200 is also connected to integrated ECU 100 and performs a process to collect logs in the zone and periodically store the collected logs in log management master 130 of integrated ECU 100. The logs in the zone include logs from each resource connected to zone ECU 200. Note that the device includes at least one of a terminal accelerator, actuator 310, sensor 320, a motor, a battery, or a charger.

Zone ECU 200 is a computer that includes a processor (microprocessor) and memories. The memories include a ROM and a RAM, for example, and can store programs to be executed by the processor. For example, a function of zone ECU 200 to control resources (e.g., actuator 310, sensor 320, and ECU 330) connected to zone ECU 200 is implemented by the processor that executes the programs stored in the memories, for example. A plurality of zone ECUs including zone ECU 200 are subject to centralized control by integrated ECU 100. Zone ECU 200 is an example of a second ECU.

Zone ECU 200 includes security event detector 210 and temporary log storage 220.

Security event detector 210 detects a security event related to a security status of the vehicle based on the logs from the resources connected to zone ECU 200. The "security event" is an event that occurs in the vehicle and is related to the security status of the vehicle. Examples of the security event include detection of abnormal communication in the vehicle, detection of an unauthorized process, and detection of what is assumed to be due to a cyberattack such as a network intrusion, data acquisition, or a system change.

The log related to the security event detected by security event detector 210 may be transmitted to integrated ECU 100 every time such a security event occurs regardless of the transmission cycle set for zone ECU 200. This is because such a log related to a cyberattack may be deleted by an attacker. Logs unrelated to security events are temporarily stored in temporary log storage 220. When an access request is authorized, those logs are transmitted together to integrated ECU 100.

Temporary log storage 220 is a storage device that temporarily stores logs from the resources connected to zone ECU 200. Temporary log storage 220 stores logs related to security events and logs unrelated to security events in a manner that allows for discrimination therebetween. Temporary log storage 220 is implemented by an HDD or a semiconductor memory, for example.

Note that the logs include a state of each of the resources, data measured at each resource, and information indicating that a predetermined condition was detected at each resource (e.g., a type of abnormality detected, detection time, etc.).

(2. Operations of Vehicle Security System)

Operations of vehicle security system 1 configured as described above will be described next with reference to FIGS. 5 to 7. FIG. 5 is a flowchart showing a first operation (security method) of integrated ECU 100 according to the present embodiment. An example in which a transmission cycle is controlled as an access volume will be described in FIG. 5.

As shown in FIG. 5, access request receiver 121 receives, from zone ECU 200, an access request for log transmission (S11). The access request here may be an access request transmitted on the base transmission cycle set in zone ECU 200, or may be an access request issued as a result of the detection of a security event.

Next, PDP coordinator 122 transmits, to dynamic authorizer 110, an access determination request for the access request received at step S11, and receives the determination result in dynamic authorizer 110. Here, it is assumed that the determination result of authorization (the access is permitted) has been received from dynamic authorizer 110.

Next, log transceiver 123 receives a log from zone ECU 200 after the authorization by dynamic authorizer (PDP) 110 (S12). The log received by log transceiver 123 is stored in log management master 130 by log controller 124.

Next, risk value calculator 126 calculates a risk value based on the log received by log transceiver 123 (S13).

Next, access volume controller 127 determines a log transmission cycle based on the risk value calculated at step S13 (S14). When the risk value of zone ECU 200 is determined to be less than a first predetermined value, access volume controller 127 may set the log transmission cycle longer than when the risk value of zone ECU 200 is determined to be at least a second predetermined value that is greater than or equal to the first predetermined value. The first predetermined value and the second predetermined value are each an example of a predetermined degree. Note that the first and second predetermined values may be the same or different from each other.

In the present embodiment, access volume controller 127 uses the tables shown in FIG. 2 or FIG. 3 to calculate the log transmission cycle according to the risk value.

When transmission cycles according to risk values are set in advance in zone ECU 200 as shown in FIG. 2, for example, access volume controller 127 selects a table corresponding to zone ECU 200 (for example, it is assumed that zone ECU 200 corresponds to zone ECU 1, and thus the table in (a) of FIG. 2 is selected). Next, access volume controller 127 identifies one transmission cycle from the selected table based on the risk value of zone ECU 200, and the identified transmission cycle may be set as the log transmission cycle in zone ECU 200.

When reference transmission cycles (base transmission cycles) are set in advance as transmission cycles in zone ECU 200 as shown in FIG. 3, for example, access volume controller 127 may calculate a transmission cycle according to a risk value based on a base transmission cycle set in zone ECU 200 and a coefficient according to the risk value (a risk coefficient). When zone ECU 200 corresponds to zone ECU 2 and the risk value is 20, for example, the base transmission cycle is 250 ms, and the risk coefficient is "×2". In this case, access volume controller 127 calculates the transmission cycle according to the risk value of such zone ECU 200 to be 500 ms (250 ms×2). This allows access volume controller 127 to control the transmission cycle to be 500 ms.

The adjustment of the transmission cycle is not limited to adjusting the time of one cycle, but may be achieved by adjusting, when a plurality of logs are transmitted together to integrated ECU 100, the number of logs to be transmitted together.

Zone ECU 200 is configured to be able to transmit a plurality of logs together to integrated ECU 100. There may be one or more logs corresponding to an access request from zone ECU 200. For example, a plurality of normal logs may be transmitted together for a single access request.

Access volume controller 127 controls the number of logs to be transmitted together according to the risk value of zone ECU 200. When the risk value of zone ECU 200 is determined to be at least the first predetermined value, access volume controller 127 may reduce the number of logs to be transmitted together. When the risk value of zone ECU 200 is determined to be less than the second predetermined value that is less than or equal to the first predetermined value, access volume controller 127 may increase the number of logs to be transmitted together. Increasing the number of logs to be transmitted together corresponds to prolonging the log transmission cycle. Increasing the number of logs to be transmitted together can reduce the number of authorization determinations in dynamic authorizer 110. Controlling the number of logs to be transmitted together is an example of controlling an access volume. Note that the first and second predetermined values may be the same or different from each other.

Referring back to FIG. 5, access volume controller 127 transmits, to zone ECU 200, information indicating the determined log transmission cycle (S15). This allows access volume controller 127 to update the transmission cycle of zone ECU 200 to the transmission cycle according to the risk value.

An example in which a determination frequency is controlled as an access volume will be described next with reference to FIG. 6. FIG. 6 is a flowchart showing a second operation (security method) of integrated ECU 100 according to the present embodiment. Note that processes of steps S11 to S13 shown in FIG. 6 are the same as those of steps S11 to S13 shown in FIG. 5, and their descriptions will be therefore omitted.

Figure 6:
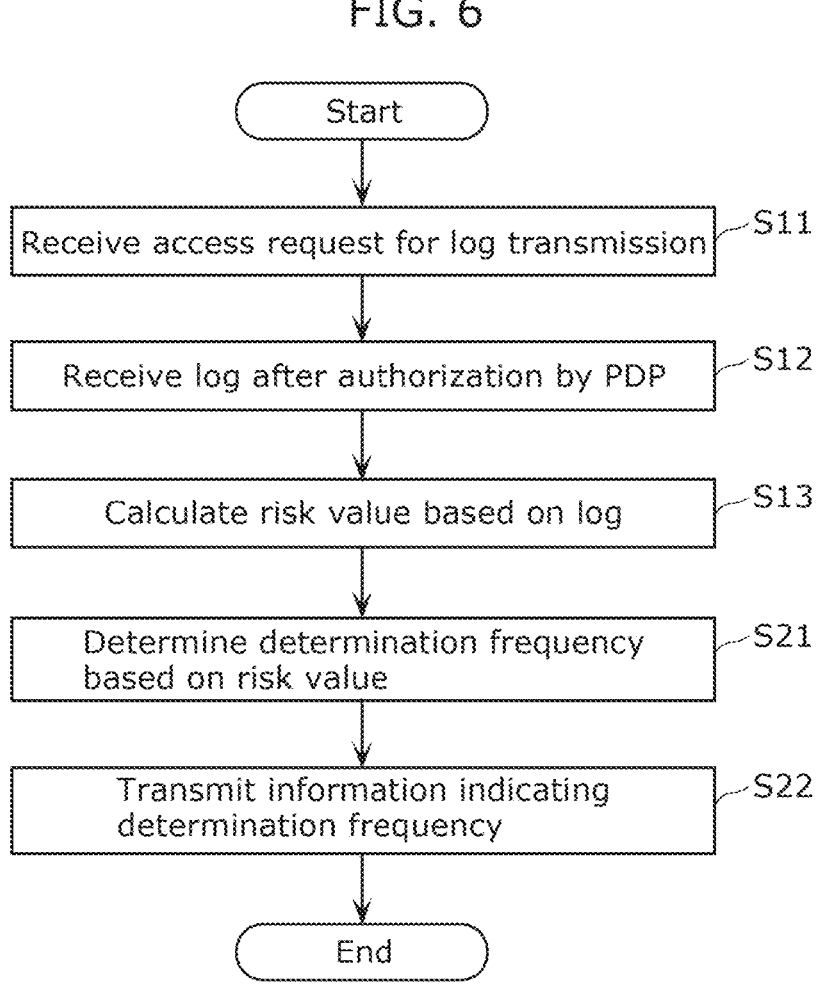
FIG. 6 is a flowchart showing a second operation of the integrated ECU according to the embodiment.

As shown in FIG. 6, when a risk value is calculated by risk value calculator 126 at step S13, access volume controller 127 determines a log determination frequency based on the calculated risk value (S21). When the risk value of zone ECU 200 is determined to be less than a first predetermined value, access volume controller 127 may set the determination frequency lower than when the risk value of zone ECU 200 is determined to be at least the second predetermined value that is greater than or equal to the first predetermined value. Note that the first and second predetermined values may be the same or different from each other.

In the present embodiment, access volume controller 127 may use the table shown in FIG. 4 to calculate the log transmission cycle according to the risk value.

When determination frequencies according to risk values are set in advance in zone ECU 200 as shown in FIG. 4, for example, access volume controller 127 may determine a determination frequency according to the risk value based on the table. Access volume controller 127 identifies one determination frequency from the table based on the risk value of zone ECU 200, and the identified determination frequency is set as the determination frequency of authorization determinations in dynamic authorizer 110.

Next, access volume controller 127 transmits, to PDP coordinator 122, information indicating the determined determination frequency (S22). This allows access volume controller 127 to update the determination frequency of dynamic authorizer 110 to the determination frequency according to the risk value.

When PDP coordinator 122 receives, from access volume controller 127, information indicating that a determination is performed every five times, for example, PDP coordinator 122 transmits, to dynamic authorizer 110, an access determination request for only one of the five access requests and does not transmit, to dynamic authorizer 110, access determination requests for the remaining four access requests. PDP coordinator 122 reuses the result of the most recent authorization determination for the four access requests for which no access determination requests are issued. In other words, PDP coordinator 122 sets the determination results for the four access requests for which no access determination requests are issued to be the same as the most recent determination result.

When the result of the most recent authorization determination is authorization, for example, a subsequent process (e.g., a process to store the logs in log management master 130) is performed assuming that the determination results for the four access requests for which no access determination requests are issued are authorization. When the result of the most recent authorization determination is denial, for example, no subsequent process is performed assuming that the determination results for the four access requests for which no access determination requests are issued are denial.

This can reduce the occurrence of the loss of logs due to buffer overflow in zone ECU 200, which is a log transmission source.

PDP coordinator 122 may be configured to unconditionally store, in log management master 130, the logs corresponding to the four access requests for which no access determination requests are issued. This can further reduce the occurrence of the loss of logs. In this case, since the frequency of transmitting logs from zone ECU 200 is kept unchanged, the logs are stably stored in log management master 130. Therefore, the accuracy of analysis in the SOC is improved compared to the case where the logs are not stably stored.

A case in which access volume controller 127 can control both a transmission cycle and a determination frequency as an access volume will be described next with reference to FIG. 7. FIG. 7 is a flowchart showing a third operation (security method) of integrated ECU 100 according to the present embodiment.

As shown in FIG. 7, access volume controller 127 controls a log transmission cycle according to a risk value in normal times when the amount of resource usage of dynamic authorizer 110 is not approaching its limit (S31).

Next, access volume controller 127 determines whether the amount of resource usage of dynamic authorizer 110 is approaching its limit based on the amount of resource usage of dynamic authorizer 110 (S32). Access volume controller 127 obtains the amount of resource usage of dynamic authorizer 110. When the amount of resource usage is greater than or equal to a predetermined amount, access volume controller 127 determines that the amount of resource usage of dynamic authorizer 110 is approaching its limit. The amount of resource usage of dynamic authorizer 110 is an example of a state of vehicle security system 1 or the vehicle.

Next, when the amount of resource usage of dynamic authorizer 110 is determined to be approaching its limit while the transmission cycle is being controlled (Yes in S32), access volume controller 127 switches the control of the access volume from controlling the transmission cycle to controlling the determination frequency (S33). This can reduce the number of authorization determinations in dynamic authorizer 110, thus effectively mitigating the state in which the amount of resource usage of dynamic authorizer 110 is approaching its limit.

When the amount of resource usage of dynamic authorizer 110 is determined not to be approaching its limit while the transmission cycle is being controlled (No in S32), on the other hand, access volume controller 127 ends the process without changing the access volume control method.

As just described, access volume controller 127 dynamically switches between controlling the access volume by controlling the transmission cycle and controlling the access volume by controlling the determination frequency, according to the amount of resource usage of dynamic authorizer 110. If a plurality of zone ECUs are connected to integrated ECU 100 and step S32 is determined to be Yes, the control of the access volume in each of the plurality of zone ECUs 200 is switched from controlling the transmission cycle to controlling the determination frequency all at once.

Access volume controller 127 may also determine whether a load of a bus to which zone ECU 200 is connected is approaching its limit. When the load of the bus is determined to be approaching its limit, access volume controller 127 may switch the control of the access volume from controlling the determination frequency to controlling the transmission cycle. The load of the bus is an example of a state of vehicle security system 1 or the vehicle.

Other Embodiments

As described above, the embodiment has been described as an example of a technology according to the present disclosure. However, the technology according to the present disclosure is not limited thereto, and can be applied also to embodiments in which modifications, replacements, additions, omissions, etc. are made as appropriate. For example, variations as described below are also included as embodiments of the present disclosure.

For example, the example in which log management master 130 is provided in integrated ECU 100 has been described in the above embodiment, but the present disclosure is not limited thereto. For example, log management master 130 may be provided in a different ECU (an ECU other than integrated ECU 100).

The example in which dynamic authorizer 110 and connection manager 120 are provided in integrated ECU 100 has been described in the above embodiment, but the present disclosure is not limited thereto. For example, dynamic authorizer 110 and connection manager 120 may be provided in a different ECU (an ECU other than integrated ECU 100).

Zone ECU 200 (zone architecture) in the above embodiment is provided by way of example only. A normal ECU may be disposed to be connected to the integrated ECU in vehicle security system 1. In other words, vehicle security system 1 may include no zone ECUs.

The example in which log management master 130 is included in integrated ECU 100 has been described in the above embodiment. However, log management master 130 may be included in a zone ECU or a normal ECU, for example.

Sensor 320 in the above embodiment is not limited to any particular type of sensor, but may be any in-vehicle sensor. Examples of sensor 320 may include a temperature sensor, a pressure sensor, a speed sensor, and a global positioning system (GPS) sensor.

The order in which the steps in each of the flowcharts are executed is presented by way of example for the purpose of specifically describing the present disclosure, and therefore those steps may be executed in any order other than the order described above. Some of the above steps may be executed simultaneously (in parallel) with other steps, or some of the above steps may not be executed.

The division of the functional blocks in the block diagram is presented by way of example. A plurality of functional blocks may be implemented as a single functional block, a single functional block may be divided into a plurality of functional blocks, or some functions may be transferred to other functional blocks. The functions of a plurality of functional blocks with similar functions may be processed by a single piece of hardware or software in parallel or time-division.

Each of the components described in the above embodiment may be implemented as software, or may be implemented typically as an LSI chip, which is an integrated circuit. These components may be implemented individually as a single chip, or may be implemented as a single chip to include some or all of the components. Such a chip is referred to as an LSI chip here, but may be referred to as an IC, a system LSI chip, a super LSI chip, or an ultra LSI chip depending on a difference in degree of integration. The technique of circuit integration is not limited to LSI. Alternatively, circuit integration may be implemented by a dedicated circuit (a general-purpose circuit configured to execute a dedicated program) or a general-purpose processor. A field programmable gate array (FPGA), which can be programmed after the manufacture of an LSI chip, or a reconfigurable processor, which can reconfigure the connections or settings of circuit cells inside an LSI chip, may also be used. Furthermore, if advances in semiconductor technology or other derivative technologies lead to the emergence of a circuit integration technology that can replace LSI, the components may be integrated using such a technology.

The system LSI chip is an ultra-multifunctional LSI chip manufactured by integrating a plurality of processors on a single chip. Specifically, the system LSI chip is a computer system configured to include a microprocessor, a ROM, a RAM, etc. The ROM stores a computer program. The system LSI chip implements its function as a result of the microprocessor operating according to the computer program.

An aspect of the present disclosure may also be a computer program that causes a computer to execute each of the characteristic steps included in the security method shown in any one of FIGS. 5 to 7.

For example, the program may be a program to be executed by a computer. An aspect of the present disclosure may also be a non-transitory computer-readable recording medium having recorded thereon such a program. For example, such a program may be recorded on a recording medium and distributed or circulated. For example, the distributed program may be installed in another device having a processor, and the program may be executed by that processor to cause the device to perform the above processes.

Forms obtained by making various modifications to the embodiment that can be conceived by those skilled in the art, as well as forms obtained by combining structural components and functions in the embodiment, without materially departing from the spirit of the present disclosure, may be included in the scope of the present disclosure.

(Supplementary Note)

The following technologies are disclosed by the description of the above embodiments.

(Technology 1) There is provided a vehicle security device installed in a vehicle. The vehicle includes: a first electronic control unit (ECU) in which the vehicle security device is provided; and a second ECU that is connected to the first ECU and controls a device provided in the vehicle. The vehicle security device includes: a dynamic authorizer that performs, when an access request for access to an access destination in the vehicle is issued from an access source in the vehicle, an authorization determination for the access request; and a connection manager that outputs, when the access request is authorized, a log corresponding to the access request to a resource of the access destination. The connection manager includes: an obtainer that obtains the access request transmitted from the second ECU; a calculator that calculates a degree of risk in the second ECU based on the log obtained; and a controller that controls an access volume to the dynamic authorizer according to the degree of risk calculated.

According to this, the access volume to the dynamic authorizer (PDP) can be controlled according to the degree of risk. Thus, the concentration of processing on the PDP can be reduced compared to a case where the access volume to the dynamic authorizer is not controlled according to the degree of risk.

(Technology 2) There is provided the vehicle security device according to Technology 1, in which the controller controls, as the access volume, a transmission cycle of the log to be transmitted from the second ECU to the vehicle security device.

According to this, the concentration of processing on the PDP can be reduced by controlling the transmission cycle of the log. Moreover, since the authorization determination is performed for each access request, the log can be collected securely.

(Technology 3) There is provided the vehicle security device according to Technology 2, in which when the degree of risk in the second ECU is lower than a first predetermined degree, the controller sets the transmission cycle of the log longer than when the degree of risk in the second ECU is at least a second predetermined degree that is greater than or equal to the first predetermined degree.

According to this, the access volume to the PDP can be reduced when the degree of risk is low. Thus, the concentration of processing on the PDP can be reduced when the degree of risk is low.

(Technology 4) There is provided the vehicle security device according to Technology 2 or 3, in which a transmission cycle according to the degree of risk is set in advance in the second ECU, and the controller sets, as the transmission cycle of the log, a transmission cycle identified based on the degree of risk in the second ECU.

According to this, since the degree of risk and the transmission cycle are set in advance, the transmission cycle can be easily identified.

(Technology 5) There is provided the vehicle security device according to Technology 2 or 3, in which a reference transmission cycle is set in the second ECU, and the controller calculates a transmission cycle according to the degree of risk based on the reference transmission cycle and a coefficient according to the degree of risk.

According to this, the transmission cycle according to the degree of risk can be calculated based on the reference transmission cycle and the coefficient according to the degree of risk.

(Technology 6) There is provided the vehicle security device according to Technology 2, in which when the degree of risk in the second ECU is at least a first predetermined degree, the controller reduces a total number of logs to be transmitted together, the logs including the log, and when the degree of risk in the second ECU is lower than a second predetermined degree that is less than or equal to the first predetermined degree, the controller increases the total number of the logs to be transmitted together.

According to this, the concentration of processing on the PDP can be reduced by changing the total number of the logs to be transmitted together.

(Technology 7) There is provided the vehicle security device according to any one of Technologies 1 to 6, in which the controller controls, as the access volume, a determination frequency of causing the dynamic authorizer to perform the authorization determination for the access request.

According to this, the concentration of processing on the PDP can be reduced by controlling the determination frequency of the authorization determination.

(Technology 8) There is provided the vehicle security device according to Technology 7, in which when the degree of risk in the second ECU is lower than a first predetermined degree, the controller sets the determination frequency lower than when the degree of risk in the second ECU is at least a second predetermined degree that is greater than or equal to the first predetermined degree.

According to this, when the degree of risk is low, the number of authorization determinations processed in the PDP can be reduced. Thus, when the degree of risk is low, the concentration of processing on the PDP can be reduced.

(Technology 9) There is provided the vehicle security device according to Technology 7 or 8, in which a determination frequency according to the degree of risk is set in advance in the second ECU, and the controller sets, as the determination frequency of the authorization determination, a determination frequency identified based on the degree of risk in the second ECU.

According to this, since the degree of risk and the determination frequency are set in advance, the determination frequency can be easily identified.

(Technology 10) There is provided the vehicle security device according to Technology 1, in which the controller controls, as the access volume, a transmission cycle of the log to be transmitted from the second ECU to the vehicle security device, and a determination frequency of causing the authorization determination for the access request from the connection manager to the dynamic authorizer to be performed.

According to this, the concentration of processing on the PDP can be effectively reduced by controlling the transmission cycle and the determination frequency.

(Technology 11) There is provided the vehicle security device according to Technology 10, in which the controller dynamically switches between controlling the access volume by controlling the transmission cycle and controlling the access volume by controlling the determination frequency, according to a state of the vehicle.

According to this, the access volume to the PDP can be controlled using the method appropriate for the state of the vehicle.

(Technology 12) There is provided the vehicle security device according to Technology 10 or 11, in which when an amount of resource usage of the dynamic authorizer is approaching a limit of the amount of resource usage while the transmission cycle is being controlled, the controller switches from controlling the transmission cycle to controlling the determination frequency.

According to this, when the amount of resource usage of the PDP is approaching its limit, the number of authorization determinations to be processed in the PDP can be reduced. Thus, the access volume to the PDP can be controlled using the method appropriate for the closeness of the amount of resource usage of the PDP to its limit.

(Technology 13) There is provided the vehicle security device according to any one of Technologies 1 to 12, including: a storage that stores the log, the storage serving as the resource.

According to this, the log can be stored in the storage included in the vehicle security device.

(Technology 14) There is provided a security method to be executed by a vehicle security device installed in a vehicle. The vehicle includes: a first electronic control unit (ECU) in which the vehicle security device is provided; and a second ECU that is connected to the first ECU and controls a device provided in the vehicle. The security method includes: performing, when an access request for access to an access destination in the vehicle is issued from an access source in the vehicle, an authorization determination for the access request by a dynamic authorizer included in the vehicle security device; and outputting, when the access request is authorized, a log corresponding to the access request to a resource of the access destination. The outputting to the resource of the access destination includes: obtaining the access request transmitted from the second ECU; calculating a degree of risk in the second ECU based on the log obtained; and controlling an access volume to the dynamic authorizer according to the degree of risk calculated.

According to this, the same effects as those of the above vehicle security device can be achieved.

(Technology 15) There is provided a non-transitory computer-readable recording medium having recorded thereon a program for causing a computer to execute the security method according to Technology 14.

According to this, the same effects as those of the above vehicle security device can be achieved.

These general or specific aspects may be realized in systems, methods, integrated circuits, computer programs, or non-transitory computer-readable recording media such as a CD-ROM, or may be realized in any combination of systems, methods, integrated circuits, computer programs, or recording media. A program may be stored in advance in a recording medium or may be supplied to a recording medium via a wide-area communication network including the Internet.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims are incorporated herein by reference in their entirety: Japanese Patent Application No. 2023-184213 filed on Oct. 26, 2023.

INDUSTRIAL APPLICABILITY

The present disclosure can be applied to in-vehicle networks, etc.

The invention claimed is:

1. A vehicle security device installed in a vehicle,
the vehicle including: a first electronic control unit (ECU) in which the vehicle security device is provided; and a second ECU that is connected to the first ECU and controls a device provided in the vehicle,
the vehicle security device comprising:
a dynamic authorizer that performs, when an access request for access to an access destination in the vehicle is issued from an access source in the vehicle, an authorization determination for the access request; and
a connection manager that outputs, when the access request is authorized, a log corresponding to the access request to a resource of the access destination,
wherein the connection manager includes:
an obtainer that obtains the access request transmitted from the second ECU;
a calculator that calculates a degree of risk in the second ECU based on the log obtained; and
a controller that controls an access volume that is a volume of access to the dynamic authorizer according to the degree of risk calculated.

2. The vehicle security device according to claim 1,
wherein the controller controls, as the access volume, a transmission cycle of the log to be transmitted from the second ECU to the vehicle security device.

3. The vehicle security device according to claim 2,
wherein when the degree of risk in the second ECU is lower than a first predetermined degree, the controller sets the transmission cycle of the log longer than when the degree of risk in the second ECU is at least a second predetermined degree that is greater than or equal to the first predetermined degree.

4. The vehicle security device according to claim 2,
wherein a transmission cycle according to the degree of risk is set in advance in the second ECU, and the controller sets, as the transmission cycle of the log, a transmission cycle identified based on the degree of risk in the second ECU.

5. The vehicle security device according to claim 2, wherein a reference transmission cycle is set in the second ECU, and the controller calculates a transmission cycle according to the degree of risk based on the reference transmission cycle and a coefficient according to the degree of risk.

6. The vehicle security device according to claim 2, wherein when the degree of risk in the second ECU is at least a first predetermined degree, the controller reduces a total number of logs to be transmitted together, the logs including the log, and when the degree of risk in the second ECU is lower than a second predetermined degree that is less than or equal to the first predetermined degree, the controller increases the total number of the logs to be transmitted together.

7. The vehicle security device according to claim 1, wherein the controller controls, as the access volume, a determination frequency of causing the dynamic authorizer to perform the authorization determination for the access request.

8. The vehicle security device according to claim 7, wherein when the degree of risk in the second ECU is lower than a first predetermined degree, the controller sets the determination frequency lower than when the degree of risk in the second ECU is at least a second predetermined degree that is greater than or equal to the first predetermined degree.

9. The vehicle security device according to claim 7, wherein a determination frequency according to the degree of risk is set in advance in the second ECU, and the controller sets, as the determination frequency of the authorization determination, a determination frequency identified based on the degree of risk in the second ECU.

10. The vehicle security device according to claim 1, wherein the controller controls, as the access volume, a transmission cycle of the log to be transmitted from the second ECU to the vehicle security device, and a determination frequency of causing the authorization determination for the access request from the connection manager to the dynamic authorizer to be performed.

11. The vehicle security device according to claim 10, wherein the controller dynamically switches between controlling the access volume by controlling the transmission cycle and controlling the access volume by controlling the determination frequency, according to a state of the vehicle.

12. The vehicle security device according to claim 11, wherein when an amount of resource usage of the dynamic authorizer is approaching a limit of the amount of resource usage while the transmission cycle is being controlled, the controller switches from controlling the transmission cycle to controlling the determination frequency.

13. The vehicle security device according to claim 1, comprising:

a storage that stores the log, the storage serving as the resource.

14. A security method to be executed by a vehicle security device installed in a vehicle, the vehicle including: a first electronic control unit (ECU) in which the vehicle security device is provided; and a second ECU that is connected to the first ECU and controls a device provided in the vehicle, the security method comprising:

performing, when an access request for access to an access destination in the vehicle is issued from an access source in the vehicle, an authorization determination for the access request by a dynamic authorizer included in the vehicle security device; and outputting, when the access request is authorized, a log corresponding to the access request to a resource of the access destination, wherein the outputting to the resource of the access destination includes:

obtaining the access request transmitted from the second ECU;

calculating a degree of risk in the second ECU based on the log obtained; and controlling an access volume to the dynamic authorizer according to the degree of risk calculated.

15. A non-transitory computer-readable recording medium having recorded thereon a program for causing a computer to execute the security method according to claim 14.

* * * * *